United States Patent [19]
Matsumoto et al.

[11] Patent Number: 5,576,766
[45] Date of Patent: Nov. 19, 1996

[54] MOVING PICTURE ENCODER

[75] Inventors: Shuichi Matsumoto; Shigeyuki Sakazawa; Takahiro Hamada, all of Tokyo, Japan

[73] Assignee: Kokusai Denshin Denwa Kabushiki Kaisha, Japan

[21] Appl. No.: 329,530

[22] Filed: Oct. 26, 1994

[30] Foreign Application Priority Data

Nov. 12, 1993 [JP] Japan .................................. 5-306140

[51] Int. Cl.⁶ .............................. H04N 7/32; H04N 7/30
[52] U.S. Cl. ........................ 348/407; 348/384; 348/403; 348/409; 348/415
[58] Field of Search ..................................... 348/384, 390, 348/401, 403, 404, 407, 409, 415

[56] References Cited

U.S. PATENT DOCUMENTS

| | | | |
|---|---|---|---|
| 5,001,561 | 4/1991 | Haskell et al. | 348/400 |
| 5,025,482 | 6/1991 | Murakami et al. | 382/239 |
| 5,107,345 | 4/1992 | Lee | 358/432 |
| 5,164,828 | 11/1992 | Tahara et al. | 348/412 |
| 5,228,028 | 7/1993 | Cucchi et al. | 370/94.1 |
| 5,233,348 | 8/1993 | Pollmann et al. | 341/67 |
| 5,270,813 | 12/1993 | Puri et al. | 348/415 |
| 5,293,229 | 4/1994 | Iu | 348/415 |
| 5,396,292 | 4/1995 | Murata | 348/409 |
| 5,491,515 | 2/1996 | Suzuki | 348/401 |

Primary Examiner—Tommy P. Chin
Assistant Examiner—Frank Snow
Attorney, Agent, or Firm—Westman, Champlin & Kelly, P.A.

[57] ABSTRACT

A moving picture encoder which is able to improve the encoding efficiency wherein a controller controls an inter/intra mode switch for generating intra and inter signals Y2 and Y4, these signals being stored in a memory. A combining unit generates a combination pattern from the intra and inter signals Y2 and Y4 stored in the memory. An information amount estimator estimates the information amounts concerning the signals Y2 and Y4 and combination pattern. A minimum information amount determining unit determines the minimum one of the estimated information amounts. The controller causes a selector to select the signal or combination pattern that corresponds to the minimum information amount for quantizing and transmitting the result to a succeeding stage.

11 Claims, 7 Drawing Sheets

MOVING PICTURE ENCODER

BACKGROUND OF THE INVENTION

1. Field of the Invention

This invention relates to moving picture encoder and, more particularly, to a moving picture encoder which is suitably used for systems for digital transmitting and storing of moving pictures with reduced bit rate, particularly television conferences, television telephones, digital television transmission, digital video storage systems, etc.

2. Description of the Prior Art

In the prior art, moving picture encoding has been made by utilizing both spatial correlation and temporal correlation.

The moving picture encoding utilizing the temporal correlation is carried out on the basis of the fact that two adjacent picture frames have many similar portions (that is, have correlation). Thus, in this method, only portions which are not similar are quantized in conversion areas. An example of encoder which realizes this method will now be described with reference to the block diagram of FIG. 1.

Referring to FIG. 1, a subfactor 71 obtains the difference between an input picture X1 and a predicted picture X2 of 8×8 pels, for instance, to generate a prediction error picture X3. Designated at numeral 72 is a converter for performing discrete cosine transform (DCT) or the like, at numeral 73 a quantizer, at numeral 74 an inverse quantizer for inversely quantizing quantized signal X4, and at numeral 75 an inverse converter for performing inverse discrete cosine transform (IDCT) or the like. An adder 76 adds together prediction error picture X5 restored by the inverse converter 75 and the predicted picture X2 to generate local decode picture X6. A predictor 77 generates the predicted picture X2 according to the local decode picture X6.

With this encoder which utilizes the temporal correlation for moving picture encoding, it is possible to greatly compress information. However, the picture signal of moving picture has local temporal correlation fluctuations. For example, in a scene where an object is moving in a certain background, the background itself and the object are similar in moving pictures. However, when a portion which has been concealed by the object in the preceding picture is revealed with the movement of the object, no similar scene to that in the preceding picture can not be found. At this time, it is preferred to directly encode the present picture signal rather than taking the difference between the prediction signal obtained from the preceding picture and the present picture signal. In other words, depending small area on picture the prediction utilizing the temporal correlation is or is not suitably carried out to obtain better encoding efficiency.

Heretofore, the encoding algorithm has been switched for each small area of picture. Of two different modes, i.e., one in which the small areas are directly encoded (intra mode), and one in which the prediction error signal is encoded (inter mode), either mode involving generation of less information is selected for encoding the small areas.

FIG. 2 is a block diagram showing an example of inter/intra mode switch encoder in the case of using the DCT. Referring to FIG. 2, designated at 78 is the inter/intra mode switch. The other reference numerals designate parts like those in FIG. 1.

The inter/intra mode switch 78 is operative for each block of 8×8 pels to select the mode which involves generation of less information at the time of quantization. With the switch 78 thrown to terminal 78a, the intra mode (i.e., direct encoding mode) is selected, and thrown to terminal 78b the inter mode (i.e., difference encoding mode) is selected.

When the intra mode and inter mode are compared for each conversion coefficient or each sub-band, the encoding mode which is suited for the encoding efficiency improvement may be different in dependence on the conversion coefficient or sub-band even in the same small area of 8×8 pels, for instance. As is seen from FIG. 2, for instance, in the inter mode the quantization error is also fed back. That is, not only the necessary signal component but also error signal is encoded and transmitted. This is inefficient particularly at the time of high compression subject to high noise power. However, the inter mode is still effective because low frequency components have high power compared to the error signal.

However, where the whole small area is dealt with either in the inter mode or in the intra mode as in the prior art, there occur conversion coefficients or sub-bands for which the encoding is done in the inadequate mode in view of the encoding efficiency improvement, thus resulting in encoding efficiency reduction.

SUMMARY OF THE INVENTION

An object of the invention is to provide a moving picture encoder, which can solve the problems inherent in the prior art as discussed above and permits encoding efficiency improvement by grouping the conversion coefficients or sub-bands in small area into a plurality of groups and applying an adequate encoding mode for each of such groups.

To attain the above object, a feature of the invention resides in a moving picture encoder, which comprises means for converting each of a plurality of small division areas of a picture, means for generating signals in a plurality of different encoding modes and a combination pattern of these signals for each converted small area, means for determining what corresponds to the minimum amount of information generated at the time of encoding among the individual encoding signals and combination pattern, and means for quantizing the encoding mode signal or combination pattern that corresponds to the minimum amount of information generated at the time of encoding and transmitting the result of quantization.

Another feature of the invention resides in a moving picture encoder, which comprises means for dividing each of the horizontal and vertical frequency bands of an input picture for producing a plurality of small area blocks according to resultant sub-band signals, means for producing a plurality of different encoding mode signals and combination pattern thereof for each of the small area blocks, means for determining what corresponds to the minimum amount of information generated at the time of encoding among the individual encoding signals and combination pattern, and means for quantizing the encoding mode signal or combination pattern that corresponds to the minimum amount of information generated at the time of encoding and transmitting the result of quantization.

DETAILED DESCRIPTION OF THE PREFERRED EMBODIMENTS

Figure 1:
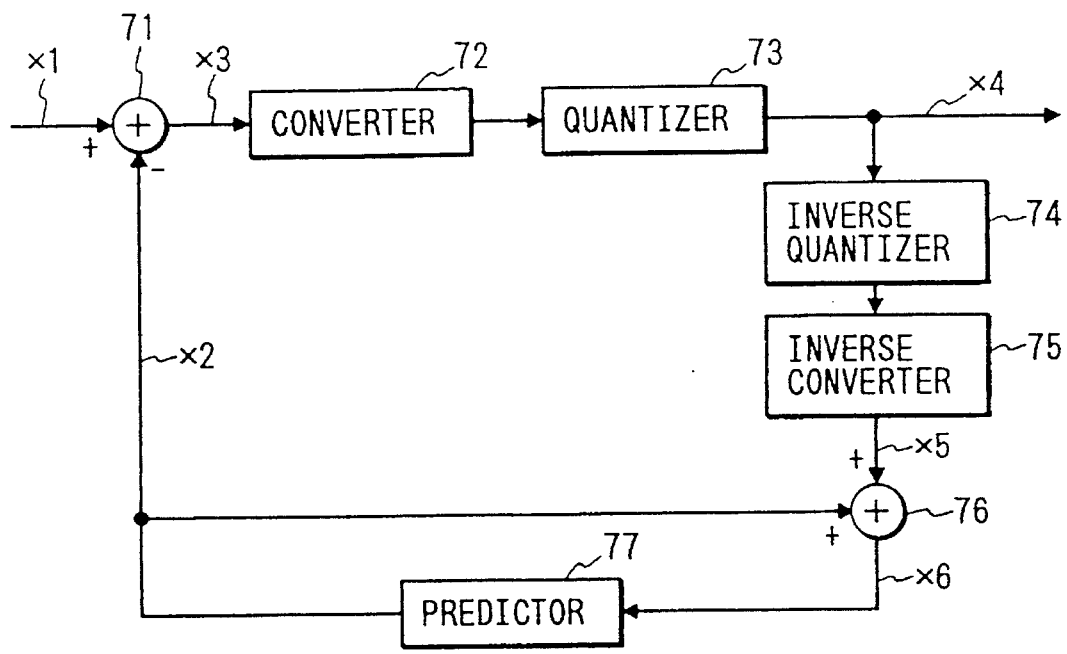
FIG. 1 is a block diagram showing an example of prior art encoder.
Figure 2:
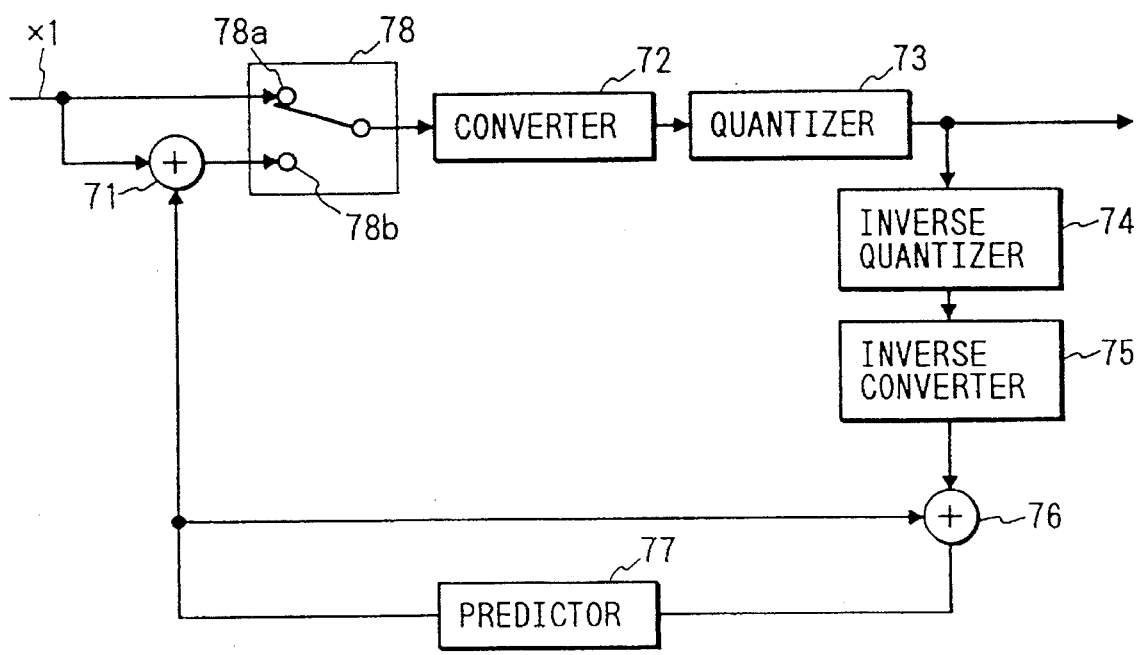
FIG. 2 is a block diagram showing a different example of prior art encoder.
Figure 3:
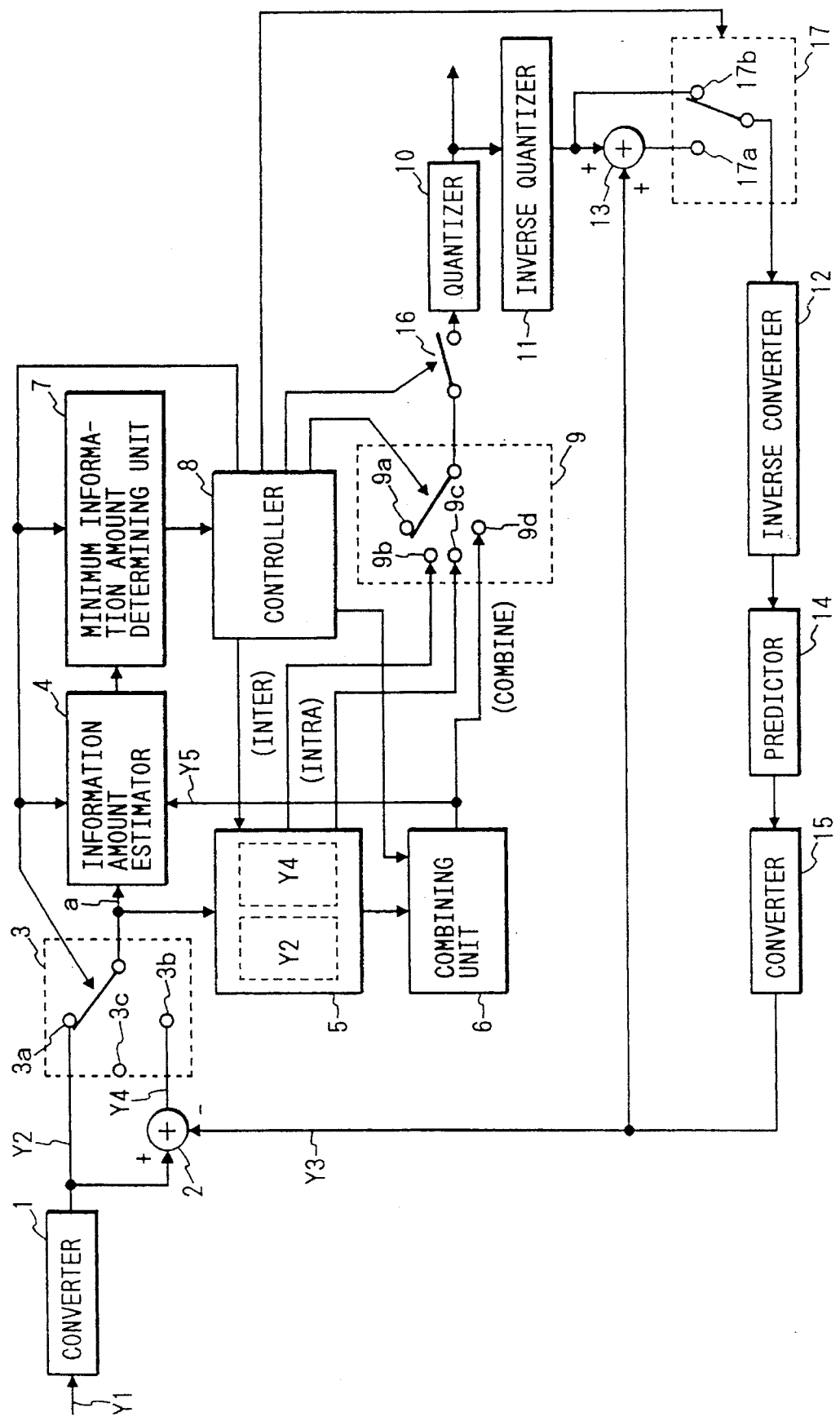
FIG. 3 is a block diagram illustrating the function of a first embodiment of the invention.

The invention will now be described in detail with reference to the drawings. FIG. 3 is a block diagram illustrating the functions of an embodiment of the invention.

Referring to the Figure, a converter 1 performs discrete cosine transform (DCT) of an input picture signal Y1 of 8×8 pels, for instance. A subtractor 2 subtracts prediction signal Y3 obtained from the preceding picture from the converted signal Y2 (intra signal) of 8×8 pels to generate signal Y4 (inter signal). An information amount estimator 4 estimates the information amount of the input data. A memory 5 accumulates intra and inter signals Y2 and Y4. A combining unit 6 combines the intra and inter signals Y2 and Y4 into a predetermined group to produce a combination pattern.

A minimum information amount determining unit 7 determines the minimum information amount among the information amounts estimated by the information amount estimator 4. A controller 8 controls the operations of the inter/intra mode switch 3, information amount estimator 4, memory 5, combining unit 6, selector 9, switching means 16, switch 17, etc. Designated at numeral 10 is a quantizer, at numeral 11 an inverse quantizer, at numeral 12 an inverse converter, at numeral 13 an adder, at numeral 14 a predictor, at numeral 15 a converter, at numeral 16 a switching means, and at numeral 17 a switch.

Figure 4:
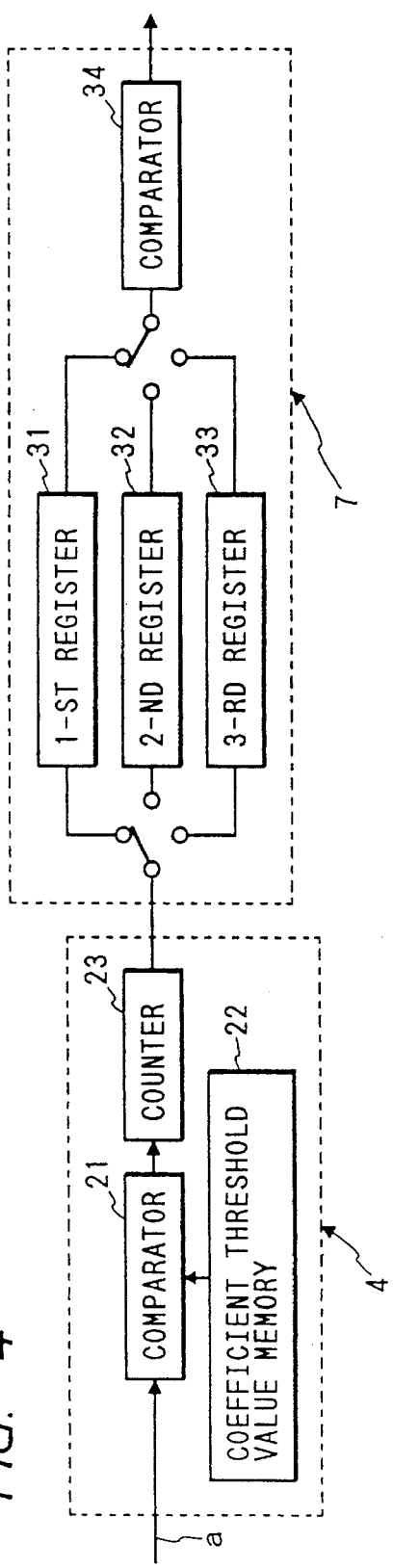
FIG. 4 is a block diagram showing a specific example of information amount estimator and minimum information amount determining unit shown in FIG. 3.

Now, an example of the information amount estimator 4 and minimum information amount determining unit 7 will be described with reference to FIG. 4. As shown in the Figure, the information amount estimator 4 includes a comparator 21, a coefficient threshold value memory 22, and a counter 23. The minimum information amount determining unit 7 includes, three, for instance, registers 31 to 33 and a comparator 34.

Figure 5:
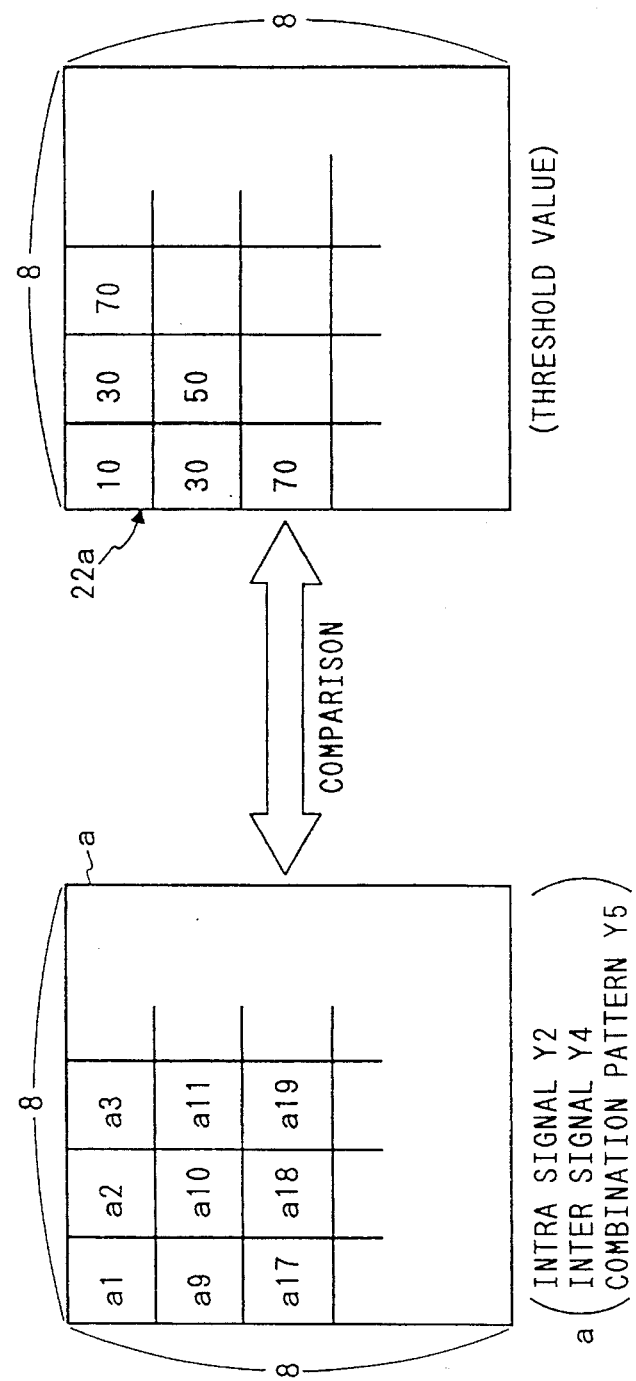
FIG. 5 is a view for explaining the operation of a comparator shown in FIG. 4.

In the coefficient threshold value memory 22, a threshold value group 22a is stored, which consists of 8×8 elements as shown in FIG. 5. The comparator 21 compares 8×8 elements a1, a2, . . . of the input signal a and the corresponding elements of the threshold value group 22a to determine which one of the two compared values is smaller. The counter 23 counts the elements of the input signal a which are smaller than the corresponding elements in the threshold value group 22a. The count is stored in the registers of the minimum information amount determining unit 7. For example, the count with respect to the intra signal Y2 is stored in the first register 31, the count with respect to the inter signal Y4 is stored in the second register 32, and the count with respect to the combination pattern Y5 is stored in the third register 33. The comparator 34 obtains the maximum value, i.e., minimum information amount, among the values stored in the registers 31 to 33 and reports data about the register in which this count has been stored, that is, the encoding mode and combination pattern concerning the minimum information amount, to the controller 8.

Figure 6:
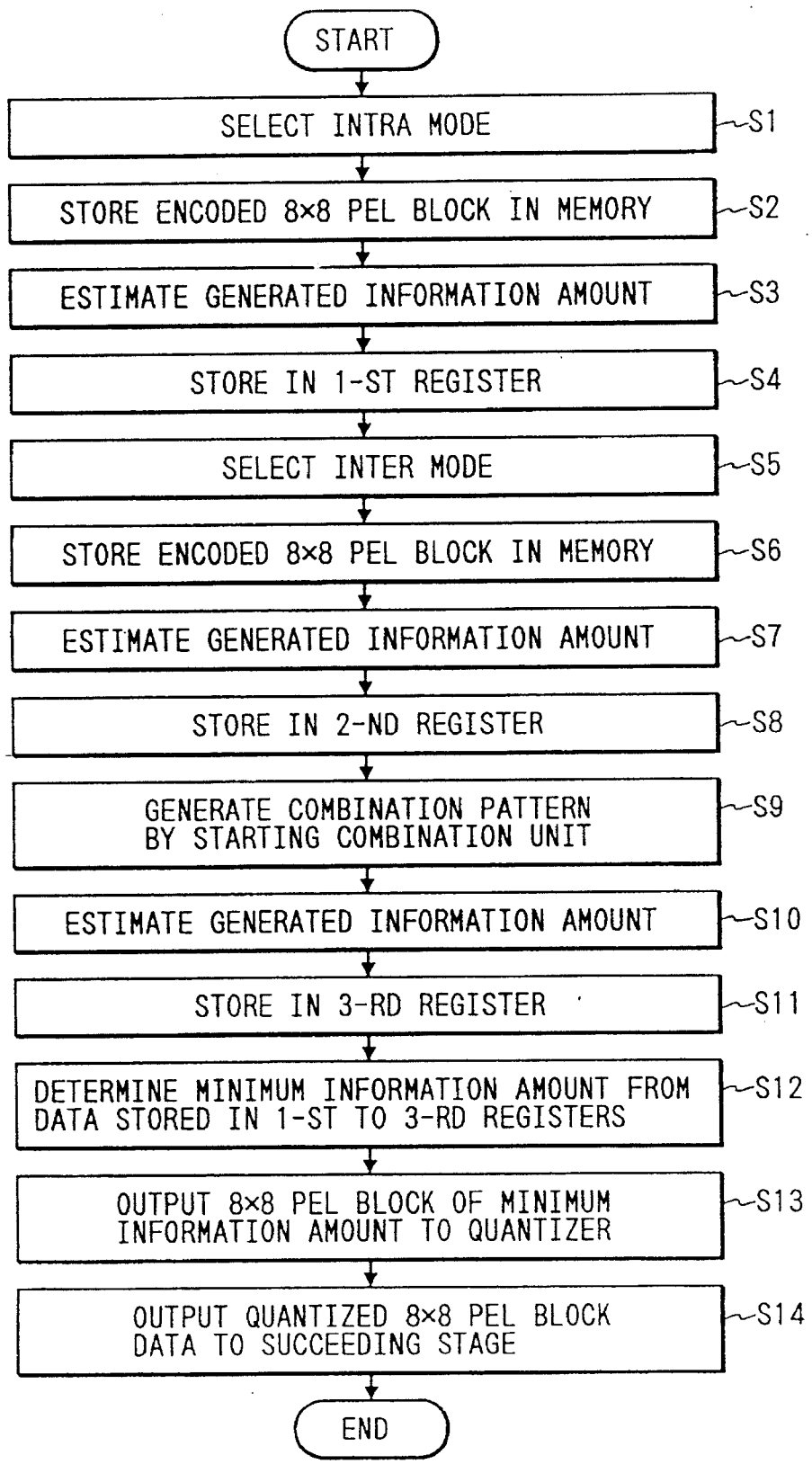
FIG. 6 is a flow chart for explaining the operation of the first embodiment.

The operation of this embodiment will now be described with reference to FIGS. 3 and 6. FIG. 6 is a flow chart summarizing the operation of the system shown in FIG. 3.

First, the controller 8 selects the intra mode by connecting the terminal 3a of the intra/inter mode switch 3 and connecting the terminal 9a of the selector 9 (step S1). The converter 1 converts the input picture signal Y1 of 8×8 pels by discrete cosine transform (DCT), for instance, to obtain the converted intra signal Y2 which is stored in the memory 5 (step S2). At the same time or subsequently, the information amount estimator 4 estimates the amount of generated information by the operation described before in connection with FIG. 4 (step S3). Specifically, the comparator 21 compares the elements of the intra signal Y2 and the elements of the threshold value group 22a stored in the coefficient threshold value memory 22, and the counter 23 counts, for instance, the former elements smaller than the corresponding latter elements, the count being stored in the first register 31 (step S4).

Subsequently, the controller 8 selects the inter mode by connecting the terminal 3a of the inter/intra mode switch 3 (step S5). As a result, the inter signal Y4 is produced through the subtraction of the prediction signal Y3 obtained from the preceding picture from the intra signal Y2, and it is stored in the memory 5 (step S6). At the same time or subsequently, the information amount estimator 4 estimates the amount of generated information by the operation as described above (step S7). The estimated information amount is stored as data in the second register 32 (step S8).

Figure 7A:
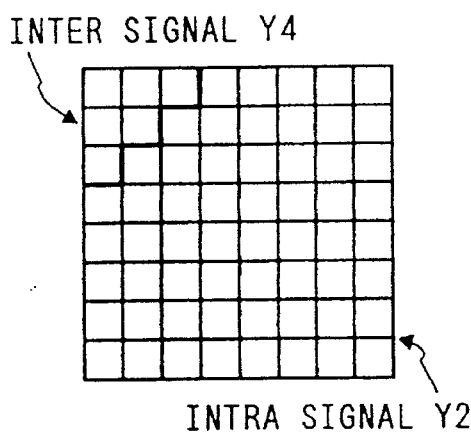
FIGS. 7A and 7B are views showing examples of combination pattern produced by a combining unit shown in FIG. 3.
Figure 7B:
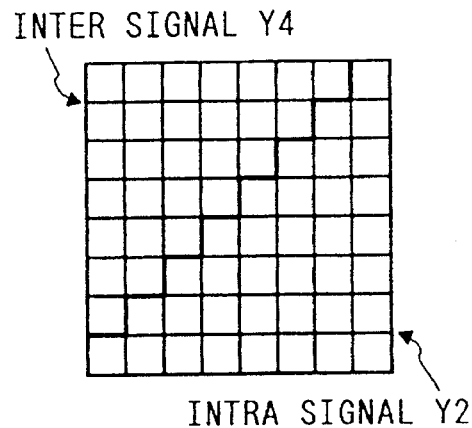

Thereafter, the controller 8 generates a combination pattern by connecting the terminal 3c of the inter/intra mode switch 3 and starting the combining unit 6 (step S9). The combining unit 6 combines the intra and inter signals Y2 and Y4 stored in the memory 5 into a predetermined pattern. For example, FIG. 7A shows a combination pattern obtained. In this pattern, 6 of 8×8 signal elements corresponding to a low frequency portion are constituted by the inter signal Y4, while the remaining 58 signal elements are constituted by the intra signal Y2. FIG. 7B shows another example of combination pattern. In this case, 28 of 8×8 signal elements corresponding to a low frequency portion are constituted by the inter signal Y4, while the remaining 36 signal elements are constituted by the intra signal Y2. It is possible to produce other combination patterns as well as the above examples.

The combination pattern output Y5 from the combining unit 6 is fed to the information amount estimator 4. The information amount estimator 4 performs information amount estimation in the same operation as described above (step S10). The estimated information amount is stored in the third register 33, for instance (step S11).

When the above operation has been ended, the minimum information amount determining unit 7 determines the minimum information amount by selecting the maximum value among the values stored in the first to third registers 31 to 33. If the minimum information amount is intra signal, the minimum information amount determining unit 7 informs the controller 8 of this fact. Likewise, if the minimum information amount is inter signal or combination pattern, the minimum information amount determining unit 7 informs the controller 8 of these facts.

When the controller 8 is informed of such fact or facts, it turns on the switching means 16 and also causes the selector 9 to select data corresponding to the minimum information amount. If the minimum information amount concerns the inter signal, for instance, the terminal 9b of the selector 9 is selected. If the minimum information amount concerns the intra signal, on the other hand, the terminal 9c of the selector 9 is selected. If the minimum information amount concerns the combination pattern, the terminal 9d of the selector 9 is selected. Further, the controller 8 selects the terminal 17a of the switch 17 if the minimum information amount concerns the inter signal, while selecting the terminal 17b in the event of the intra signal. If the minimum information amount is of the combination pattern, the terminal 17a is selected in case when the inter signal group in the combination pattern is being inversely quantized, and the terminal 17b is selected in case when the intra signal group is being inversely quantized.

The data selected by the selector 9 is fed through the switching means 16 to the quantizer 10 (step S13). The quantizer 10 quantizes the data of the minimum information amount and outputs the resultant data to the succeeding stage (not shown) (step S14). The quantized data is also fed to the inverse quantizer 11. If the data that has been obtained as a result of inverse quantization is inter signal, its sum with the signal Y3 is fed to the inverse converter 12 for canceling the subtraction made in the subtractor 2. If the inversely quantized data is intra signal, on the other hand, the terminal 17b of the switch 17 is selected to feed the data directly to the inverse converter 12. The inversely converted data from the inverse converter 12 is fed to the predictor 14 to generate prediction signal. At the time of the process with respect to the succeeding picture, the prediction signal is read out and fed to the converter 15. The converter 15 thus outputs prediction signal Y3 concerning the succeeding picture.

When the above operation has been ended, the controller 8 connects the terminal 9a of the switch 9 again, and executes the same operation as described before with respect to the next 8×8 pel input picture signal. The operation is of course carried out repeatedly until there is no longer any input picture signal.

In this embodiment, with the above operation it is possible to adopt an encoding mode, in which the amount of information generated for encoding with respect to the 8×8 pel input image signal Y1 is minimum. It is thus possible to permit encoding efficiency improvement.

Figure 8:
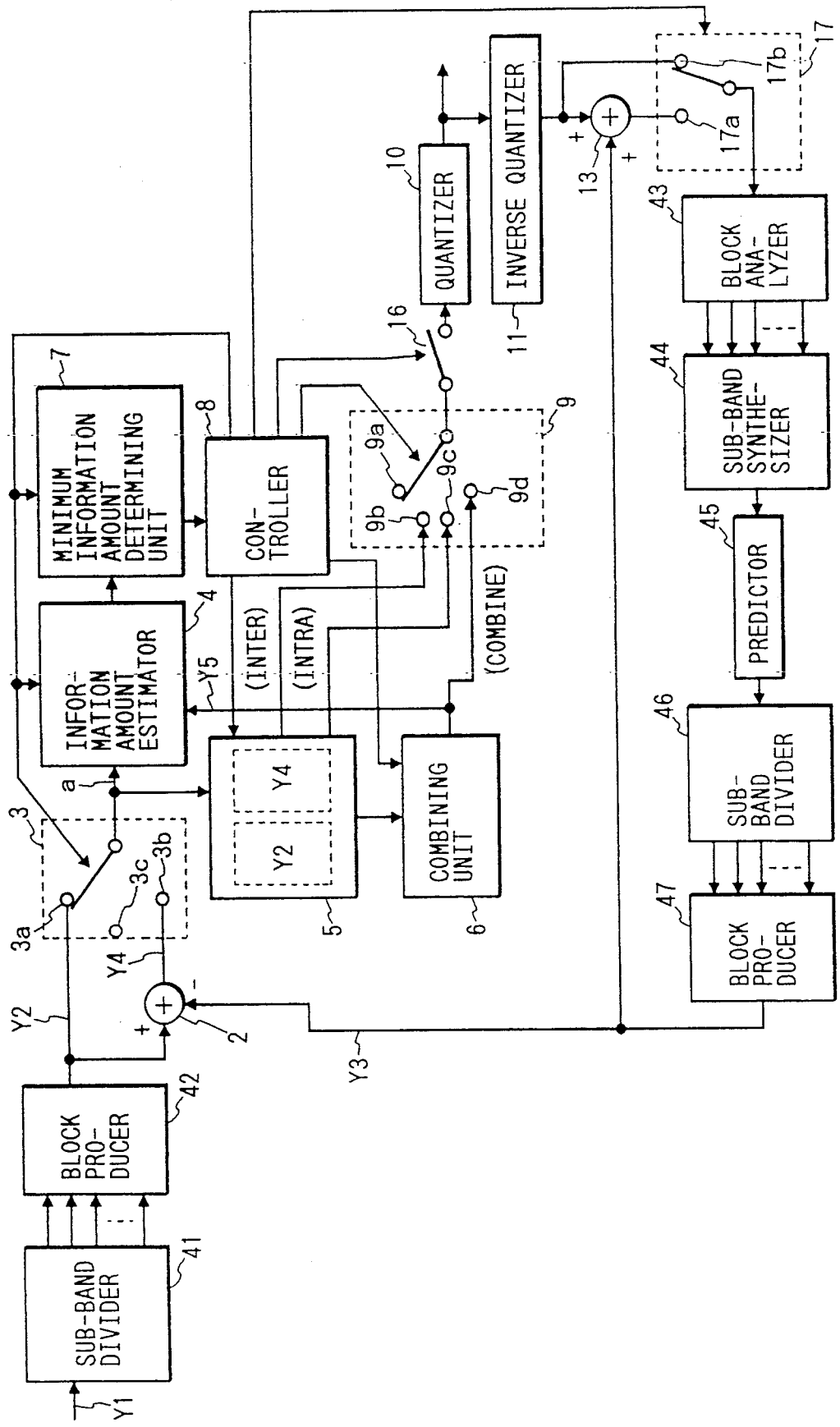
FIG. 8 is a block diagram illustrating the function of a second embodiment of the invention.

FIG. 8 shows a second embodiment of the invention. In this embodiment, the invention is applied to a band division encoder. Referring to the Figure, designated at numeral 41 a sub-band divider, at numeral 42 a block producer, at numeral 43 a block disassembler, at numeral 44 a sub-band synthesizer, at numeral 45 a predictor, at numeral 46 another sub-band divider, and at numeral 47 another block producer. The other reference numerals designate parts like those in FIG. 3.

This embodiment is different from the previous first embodiment only in that the converter 1 in the first embodiment is replaced with the sub-band divider 41 and the block producer 42 and that the block divider 43 and sub-band synthesizer 44 are set before the predictor 45 and sub-band divider 46 and block producer 47 are set after one, the remainder being the same as the first embodiment. Thus, description will be made with respect to sub-band division and block production alone.

Figure 9A:
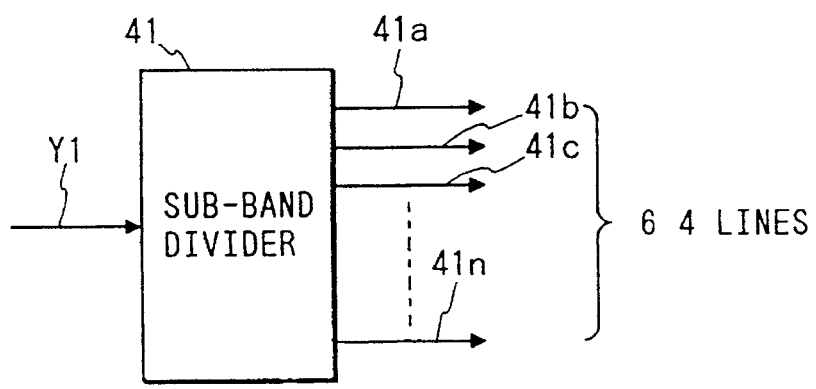
FIGS. 9A and 9B are views for explaining the operation of a sub-band divider.
Figure 9B:
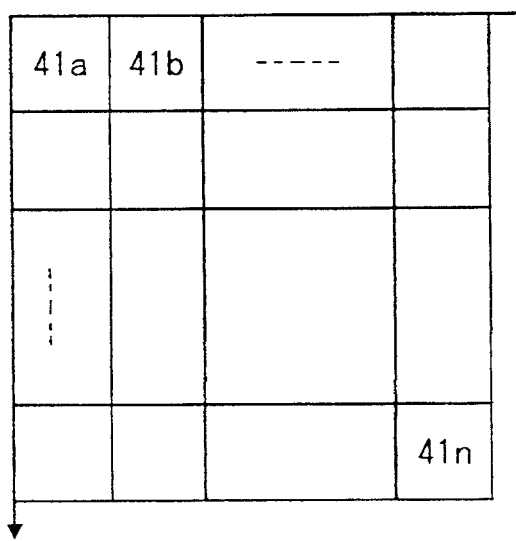

The sub-band divider 41, as shown in FIG. 9A, divides each of the horizontal and vertical frequency bands of input picture Y1 into 8 equal divisions, thus producing a total of 64 sub-bands 41a, 41b, ... 41n as shown in FIG. 9B. In this case, picture of each sub-band is limited to one-eighth of the band of the original picture both in the horizontal and vertical directions. That is, it has only one-eighth of the information amount both in the horizontal and vertical directions. Thus, in the theory of sampling it is possible to reduce the number of pels in picture of each sub-band into one-eighth both in the horizontal and vertical directions compared to the original picture. This means that each of the 64 sub-bands constitutes picture of 1/64 of the number of pels of the original picture, that is, the total pel number is equal to the pel number of the DCT in the converter 1.

Figure 10:
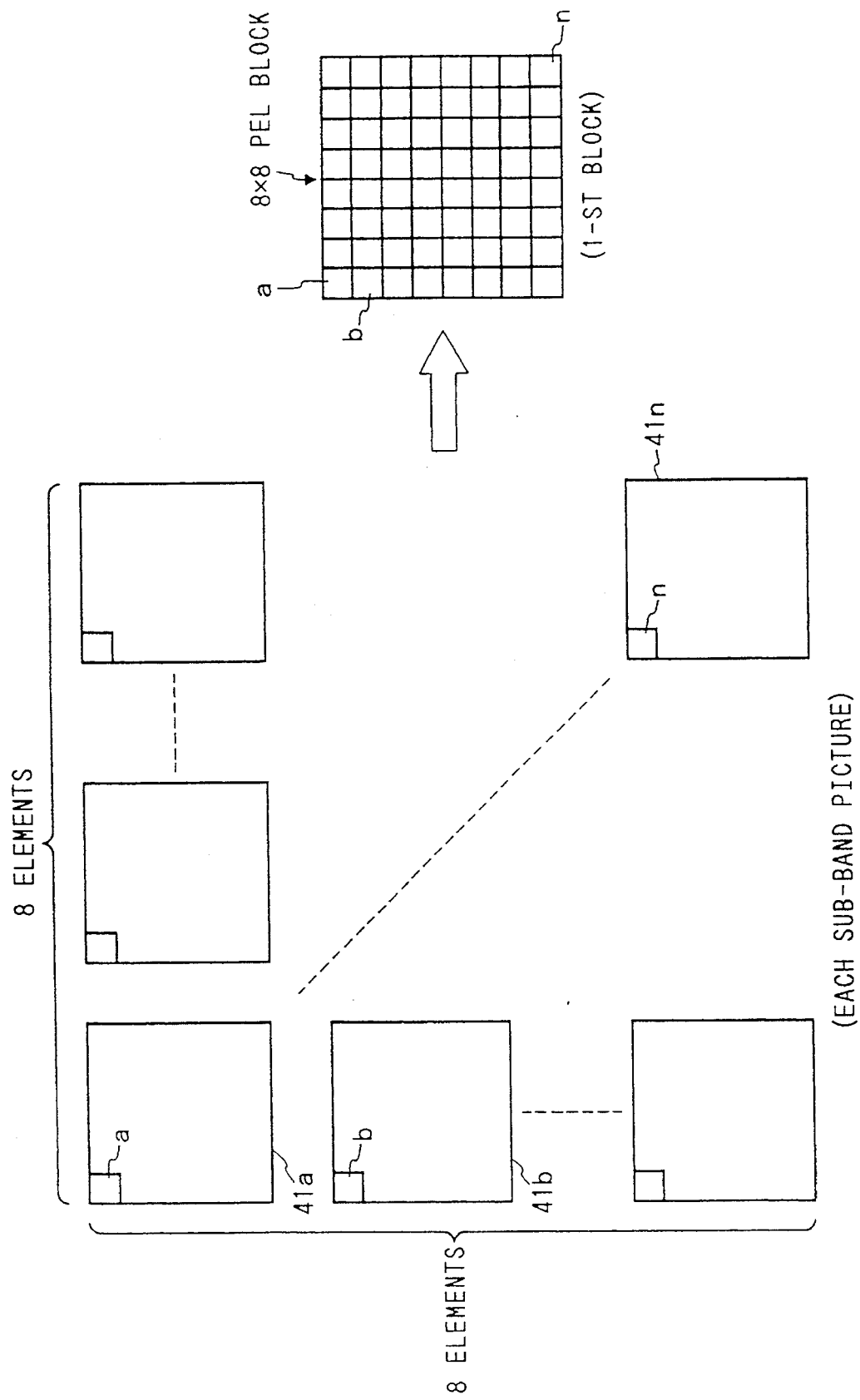
FIG. 10 is a view for explaining the operation of a block producer.

In other words, the number of pels in picture of each sub-band corresponds to the result of thinning of the pels in the original picture into one-eighth in both the horizontal and vertical directions. Thus, in the positional relation one pel in each sub-band corresponds to one 8×8 pel area on the original picture. Conversely, one 8×8 pel block of the original picture is converted to one pel of the 64 sub-band picture. Thus, the block producer 42, as shown in FIG. 10, collects one like position pel in each sub-band picture to obtain an 8×8 pel block corresponding to the DCT conversion coefficient block.

In this embodiment, the 8×8 pel block output from the block producer 42, is processed to generate intra and inter signals and a combination pattern, with respect to each of which the minimum information amount is determined. When the minimum information amount has been determined, the controller 8 causes the selector 9 to select the corresponding signal or combination pattern for quantization in the quantizer 10, the output of which is supplied to the succeeding stage (not shown). The above operation is performed on all the 8×8 pel blocks output from the block producer 42.

With this embodiment, the same effects as those in the first embodiment are obtainable.

In the embodiments as described above, the minimum information amount was determined from the intra and inter signals and one combination pattern, but this is by no means limitative. For example, it is possible to arrange such as to determine the minimum information amount from the intra and inter signals and a plurality of combination patterns. In this case, the plurality of combination patterns are obtained by combining pluralities of different intra and inter signal groups.

Further, instead of the minimum information amount determination system in the above embodiments, it is possible to determine as the minimum information amount, for instance, what is minimum as the sum of the squares of the elements of intra and inter signals and combination pattern.

Further, the controller 8 in the above embodiments is capable of transmitting selection data concerning the mode in which the amount of information generated at the time of the encoding (i.e., either intra mode, inter mode or combination mode) is minimum to a decoder (not shown) for decoding of data therein in corresponding to that mode.

The structures shown in FIGS. 3 and 8 are only illustrative of the invention, and various changes and modifications may be made without departing from the scope and spirit of the invention.

It will be understood from the foregoing that according to the invention an apt or adequate encoding mode can be selected for each conversion coefficient, thus permitting information amount reduction compared to the prior art encoder. Further, with the same amount of generated information as in the prior art, it is possible to obtain picture quality improvement with the same data transmission rate.

What is claimed is:

1. A moving picture encoder comprising:

means for converting each of a plurality of small division areas of a picture;

means for generating signals in a plurality of different encoding modes and a combination pattern of these signals for each converted small area;

means for determining what corresponds to the minimum amount of information generated at the time of encoding among the individual encoding mode signals and combination pattern; and means for quantizing the encoding mode signal or combination pattern that corresponds to the minimum amount of information generated at the time of encoding; and means for transmitting the result of quantization.

2. The moving picture encoder according to claim 1, wherein said converting means performs discrete cosine transform (DCT).

3. A moving picture encoder comprising:

means for dividing each of the horizontal and vertical frequency bands of an input picture for producing a plurality of small area blocks according to resultant sub-band signals;

means for producing a plurality of different encoding mode signals and combination pattern thereof for each of the small area blocks;

means for determining what corresponds to the minimum amount of information generated at the time of encoding among the individual encoding signals and combination pattern; and means for quantizing the encoding mode signal or combination pattern that corresponds to the minimum amount of information generated at the time of encoding; and means for transmitting the result of quantization.

4. The moving picture encoder according to claim 1, wherein the plurality of different encoding modes are an intra mode and an inter mode.

5. The moving picture encoder according to claim 3, wherein the plurality of different encoding modes are an intra mode and an inter mode.

6. The moving picture encoder according to claim 1, wherein the combination pattern is constituted by inter signal corresponding to a low frequency portion of those of the small areas and intra signal corresponding to a high frequency portion of those of the small areas.

7. The moving picture encoder according to claim 3, wherein the combination pattern is constituted by inter signal corresponding to a low frequency portion of those of the small areas and intra signal corresponding to a high frequency portion of those of the small areas.

8. The moving picture encoder according to claim 1, which further comprises means for storing the signals in said generating means in the plurality of different encoding modes, and means for combining the signals in the plurality of different encoding modes stored in said storing means to produce a combination pattern.

9. The moving picture encoder according to claim 3, which further comprises means for storing the signals in said producing means in the plurality of different encoding modes, and means for combining the signals in the plurality of different encoding modes stored in said storing means to produce a combination pattern.

10. The moving pattern encoder according to claim 1, wherein selection data about the encoding mode signal or combination pattern that corresponds to the minimum amount of information generated at the time of encoding are transmitted to a decoder.

11. The moving pattern encoder according to claim 3, wherein selection data about the encoding mode signal or combination pattern that corresponds to the minimum amount of information generated at the time of encoding are transmitted to a decoder.

* * * * *